July 17, 1973    Z. J. MAJEWSKI ET AL    3,746,593
MANUFACTURE OF BOXES FROM CORRUGATED BOARD AND LIKE MATERIALS
Filed Sept. 10, 1968    3 Sheets-Sheet 1
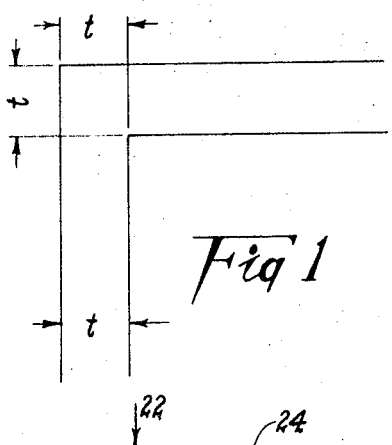
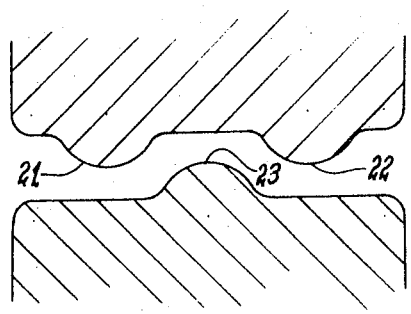
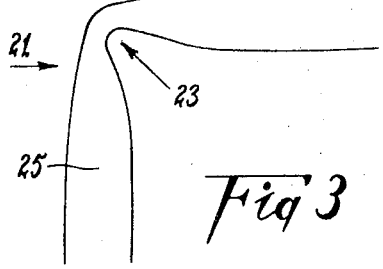
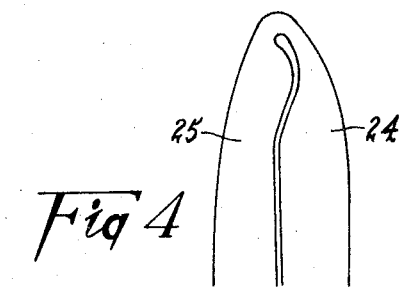
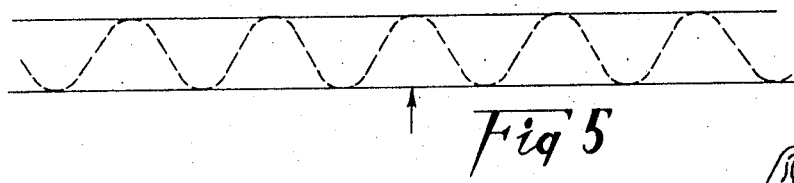
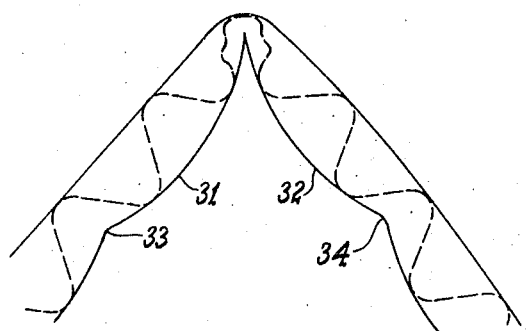
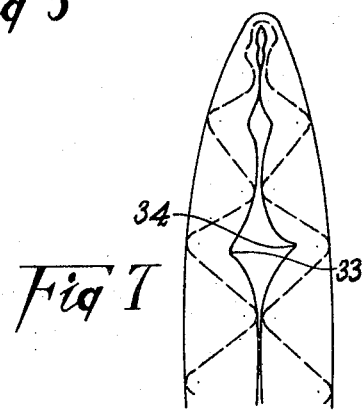
ZBIGNIEW JAN MAJEWSKI, INVENTOR
By Wenderoth Lind & Ponack,
Attorneys

United States Patent Office 3,746,593
Patented July 17, 1973

3,746,593
MANUFACTURE OF BOXES FROM CORRUGATED BOARD AND LIKE MATERIALS
Zbigniew Jan Majewski, North Blawyn, Victoria, Australia, assignor to Australian Paper Manufacturers Limited, Melbourne, Victoria, Australia
Filed Sept. 10, 1968, Ser. No. 758,854
Claims priority, application Australia, Sept. 14, 1967, 27,210/67
Int. Cl. B31f 1/08
U.S. Cl. 156—207
20 Claims

ABSTRACT OF THE DISCLOSURE

A method of forming foldable creases in corrugated board by forming a single crease in the "outer" liner (with respect to the fold) and a creased zone in the inner liner and interior corrugated member so as to form a hinge which is asymmetrical in cross section whereby during folding the board sufficient inward deformation of the inner liner and corrugated member occurs to prevent outward bulging of the inner liner and permit effective bending of the outer liner while minimizing any tendency to crack, the liners remaining flat and parallel up to a zone adjacent the crease and creased zone, even if the folding operation occurs through 180°.

---

This invention relates to the creasing of so-called corrugated board of the kind which is particularly suitable for use in the manufacture of rectangular boxes having end closure flaps and which are assembled from corrugated board blanks cut and creased in such a manner that they may be initially folded into flat blanks and erected when required into the desired box-like formation.

The term "corrugated board" is intended to refer to the well-known type of product which is made of cardboard, paper or any other suitable material and consists of substantially parallel inner and outer flat liners having a corrugated or like reinforcing member therebetween which has a series of parallel elongated crests to which the inner and outer liners are secured by an adhesive.

In forming knock-down rectangular boxes from corrugated board of the kind indicated, it is customary trade practice to form two types of foldable creases in the board blank. Firstly, one type which extends parallel to said corrugations and secondly another type which extends crosswise of the corrugations at substantially right angles thereto.

The first-mentioned type of crease is usually employed to form the junction at the upstanding corners between the side walls of the box and at least some of these creases should be capable of being folded through an angle of 180° without cracking when the box blank is folded flat during storage and transport, prior to being erected into the desired box-like form.

The second type of crease is adapted to form the junctions between the side walls of the box and the usual flaps employed for closing the top and bottom of the box when in use. These flaps are normally intended to be capable of folding through an angle of 180° without cracking.

The first-mentioned type of crease is known in the trade as a "cross direction" or "C.D." crease, whilst the second type of crease is commonly known as a "machine direction" or "M.D." crease.

Corrugated board of this type has been found eminently suitable for boxes which after filling with the desired commodity have to be stacked one upon the other and kept under such conditions for long periods of time. If the boxes are formed such that when erected and stacked the corrugations extend vertically in the side walls, they are found to possess a substantial resistance to deformation even under considerable loads. This is evidently important more especially for boxes at or near the bottom of the stack due to the height to which through exigencies of space or otherwise it is generally found necessary or convenient to store the boxes.

For the present purposes it is proposed to adopt the normal terminology of the art by calling such boxes "corrugated boxes." These are generally produced initially as blanks which have been creased, folded, stitched, taped and/or glued as necessary and dispatched for use in a flat condition from which they con conveniently be erected prior to filling, the creasing in particular having been effected at such positions and in such a manner as to minimize difficulties of filling, sealing and stacking.

It is known to crease the board by passing it through a nip between the co-operating rims of two die wheels of which the peripheries are so ribbed, flanged or otherwise shaped, as seen in a cross-section through the axis of the wheel, as to produce the desired crease. A variety of shapes is used in the trade. Buchanan ("The Effect of Crease Form on the Compressive Strength of Corrugated Cases" in "Packaging" of March 1963, pp. 37 to 43) has found that box strength can vary by up to 25% depending on the form of the crease. He also states that none of his investigated crease forms was ideal. He found that box strength is increased by making the crease narrower and thereby preserving the ability of the wall to stand compressive loads. However narrower creases require greater forces to fold the board. These forces cause excessive stresses in the outer liner of the composite corrugated board and consequent cracking of the liner.

It is an object of this invention to provide for creasing corrugated board so as to avoid undue stresses thereby reducing the risk of cracking while maintaining a high degree of strength and resistance to stress.

According to the present invention a method of forming foldable creases in corrugated board of the kind indicated comprises forming one substantially straight crease only in the outer liner and a substantially straight creased zone in the inner liner and corrugated member, said zone being substantially parallel to the crease and so disposed in relation thereto that they in effect form a hinge which is asymmetrical in cross-section, said zone being of such predetermined width that during bending or folding of the board sufficient inward deformation of the inner liner and corrugated member occurs in and adjacent to their creased zone to prevent or minimize outward bulging of the inner liner and at the same time permits effective bending of the outer liner at its crease, whilst any undesirable tendency to crack at this crease is minimized, and at the same time the inner and outer liners of each of the relatively folded portions of the corrugated board remain substantially flat and parallel up to a zone adjacent said crease and creased zone.

But in order that the invention may be better understood, reference will now be made to the accompanying drawings which are to be considered as part of this specification and read herewith. In the drawings:

FIG. 1 is a section of an ideal configuration for a box edge;

FIG. 2 is a part-section showing the facing flanged rim portions of a pair of cooperating die wheels used in a known method of forming a "three-point crease";

FIG. 3 is a section of a corrugated board creased in the machine direction by the apparatus shown in FIG. 2 and folded through 90°;

FIG. 4 is a section similar to FIG. 3 but showing the same board folded through 180°;

FIG. 5 shows one form of corrugated board in part section perpendicular to the board and in the machine-direction (i.e. the section looks in the cross-direction). This drawing is to be used in explaining the deficiencies in prior methods of forming cross-direction creases;

FIG. 6 is a cross-section in the same plane as FIG. 5 showing the configuration assumed in folding by the board illustrated in FIG. 5 after having been creased by prior methods at the point indicated by the arrow;

FIG. 7 is a section in the same plane as FIGS. 5 and 6 showing the configuration when folded through 180°;

Figure 12:
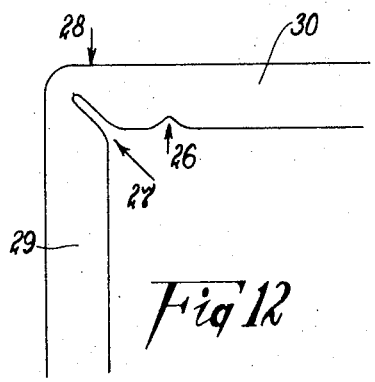
FIG. 12 is a section of a corrugated board creased in the machine direction by a process in accordance with one preferred embodiment of the present invention and folded through 90°.
Figure 14:
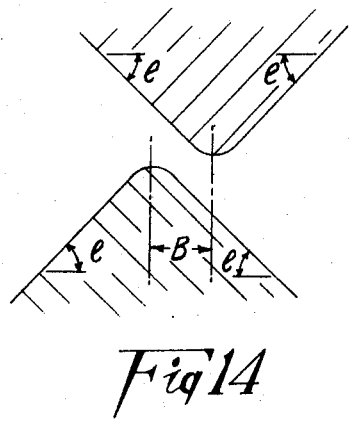
Figure 15:
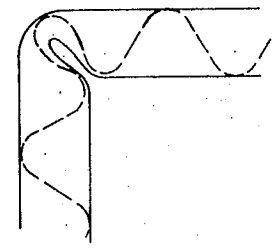
Figure 16:
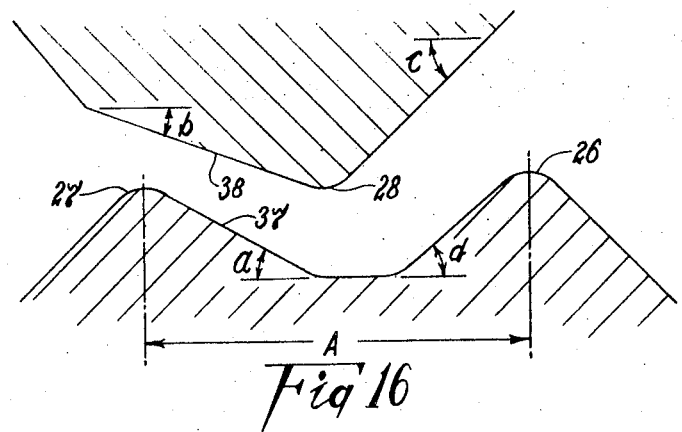
Figure 17:
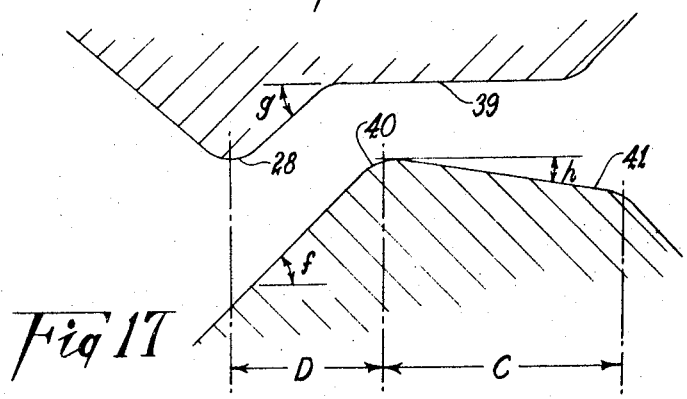
Figure 18:
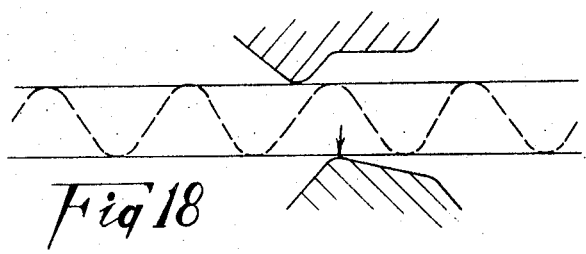
Figure 19:
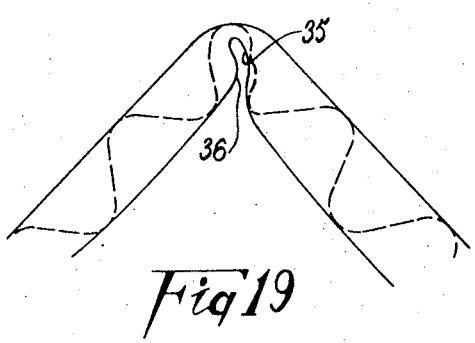

FIG .13 is a section similar to FIG. 12 but showing the same board folded through 180°;

FIG. 14 is a part-section showing the facing flanged rim portions of a pair of co-operating die wheels used in carrying out a process according to one embodiment of this invention for creasing corrugated board in the cross direction;

FIG. 15 is a section of a corrugated board creased in the cross-direction by the apparatus shown in FIG. 14 and folded through 90°;

FIG. 16 is an enlarged diagrammatic part section illustrating distances and angles to be referred to hereinafter in relation to one preferred M.D. crease profile in accordance with this invention;

FIG. 17 is a diagram similar to FIG. 16 but illustrating a preferred form of C.D. crease profile;

FIG. 18 is a section showing the same board as in FIG. 5 and a part section showing the facing flanged rim portions of a pair of cooperating die wheels used in carrying out a process according to a preferred embodiment of this invention for creasing corrugated board in cross-direction;

FIG. 19 shows the configuration during folding to 180°, and

Figure 20:
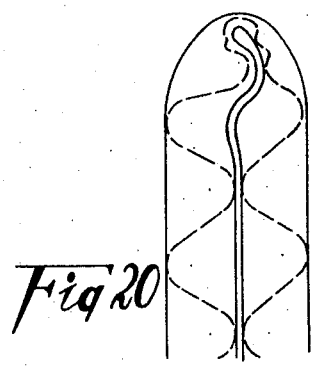

FIG. 20 shows the configuration at 180°, of the board after having been creased by the apparatus shown in FIG. 18.

It will be appreciated that the folds illustrated in the drawings are all shown in sections at right angles to the crease and creased zone in the outer and inner liners respectively, as are the wheel rim configurations and crease profiles illustrated in FIGS. 2, 8 to 11, 14, 16, 17 and 18.

In general the following creases are required in the formation of a box:

(a) "Machine Direction" (M.D.) creases which become the edges between the walls and flaps of the box. These creases run along the grain (i.e. the direction in which the board was made on the paper machine and converted on the corrugating machines) and across the corrugations of the composite board, and (b) "Cross Direction" (C.D.) creases, which become the edges between the walls of the box. These creases run across the grain (i.e. at right-angles to the machine direction) and parallel to the corrugations of the composite board.

A rectangular box requires four C.D. creases (only three for boxes which have one edge taped) two of which are folded through 180° during making of the blank. The other two (or one in the case of a taped box) remain flat until they are folded through 90° prior to filling the box. It follows that only two C.D. creases suffer stresses by folding through a 180° fold whereas the others must withstand only a 90° fold. We have found that for a maximum box strength these two types of crease are not necessarily the same nor formed in the same manner.

Referring to the drawings in more detail, FIG. 1 shows a box edge having an ideal (although unrealizable in practice) configuration as far as strength and rigidity are concerned. As the board has a substantial thickness, depending upon the corrugation amplitude of the interior corrugated member, it will be evident that when the board is folded, the "inner" liner i.e. the liner which is innermost with respect to the fold or proposed fold, is compressed and the outer liner stretched, the effective difference in length for a 90° fold amounting to about twice the board thickness in the ideal case illustrated in FIG. 1. The problem is therefore to accommodate the inner without cracking the outer liner or otherwise reducing the strength of the box.

Prior attempts to solve this problem have not been satisfactory. As an example of known techniques, we propose to describe a "three-point crease." Such may be formed by passing the board through the nip between a pair of co-operating die wheels as illustrated in FIG. 2 with the outer liner uppermost. Flanges 21 and 22 form two distinct creases in the outer liner and flange 23 forms a single crease in the inner liner of the board. The configurations assumed by the board after folding through 90° and 180° are shown in FIGS. 3 and 4 respectively, portion 24 being destined to form a flap of the box and portion 25, a side wall. The main disadvantages of this crease form are:

(a) A sharp symmetrical peak is formed on the inside of the fold, causing high stresses in both inner and outer liners. When the board is folded through 180°, as is often done to test the tendency of the outer liner to crack, there are two possible results. Either a crack occurs, or the inner liner is compressively deformed and the corrugations are irregularly squashed. The latter deformation relieves stresses acting within the outer liner but reduces compressive strength of the box, and (b) The wall 25 has been creased (crease points indicated by arrows corresponding to flanges 21, 22 and 23) and its compressive strength reduced. This configuration is prone to "roll" under compressive load. Such rolling results in bulging of the wall and in excessive loading on the less deformable corner of the box. Such uneven load distribution invariably reduces the compressive strength of the box.

The three-point crease form is considered to be a severe crease and leads to cracking of boards. Other crease forms will accordingly crease or otherwise weaken a wider strip of the board to reduce this cracking tendency. Then rolling of the edges and bulging of the walls will lead to an earlier collapse of the box.

Figure 13:
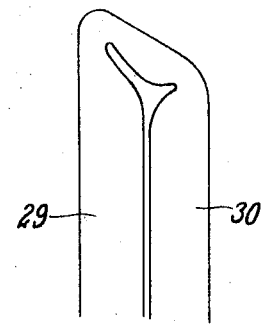

Having in view the above problems and the object stated hereinabove, my invention overcomes or substantially overcomes the disadvantages inherent in known creases by achieving a much more suitable configuration of the folded board. One form of my invention which is especially suitable for a machine direction crease is shown in FIGS. 12 and 13 in which the arrows again indicate crease points. It can be seen that:

(a) By forming the inner liner creased zone with a secondary crease (arrow 26) as well as a primary crease 27, the inner liner can be readily accommodated within the fold. The outer liner which is creased at 28 is therefore stressed less and is less likely to crack;

(b) The wall portion 29 of the box is substantially free from creasing or any other operation tending to weaken it, and its load-bearing capacity has been substantially completely preserved;

(c) The deformation of the board during folding occurs substantially entirely in flap 30 rather than side wall 29;

(d) "Rolling" of the edge during vertical compression of the box is greatly reduced because almost the entire thickness of the uncreased wall bears the load. Bulging of the wall is thereby reduced and the load is carried substantially uniformly by the panels and the corners;

(e) When the board is folded through 180° the secondary crease folds inwardly and in fact two creases are formed, again reducing the tendency to crack, and (f) According to Buchanan loc. cit. the narrower the creases the stronger is the box. For the M.D. crease the effective width of the crease is a minimum since wall 29 is not creased and most of the deformations occur in flap 30. It will be shown that the C.D. creases of 180° and 90° the width of the crease is as narrow as required to form the fold.

It will be seen that this invention provides for producing the foldable creases in an asymmetrical fashion so that under the type of stress which the box may have to carry when in use, the strain is concentrated in the horizontal rather than the vertical parts of the box. The configuration thus realized is found to fulfil substantially all known requirements of a box of greatly increased strength while at the same time my manner of creasing tends to reduce any cracking in the outer liner. In the embodiment wherein the invention provides primary and secondary creases in the inner liner, the primary crease folds first and determines the position of the box edges. The secondary crease initially serves the purpose of relieving the stress in the outer liner by providing accommodation for the inner liner. Subsequently during the folding through 180° it becomes a second crease giving a well-controlled and virtually stress-free deformation.

To achieve the desired configuration, this invention in one embodiment provides crease forms which fulfill two requirements (i) that there are two distinct creases made on the inner liner of the board and (ii) that there is a bias towards one viz the primary crease.

Figure 8:
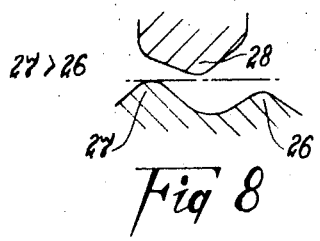
FIGS. 8, 9, 10 and 11 are part-sections showing in diagrammatic form the facing rim portions of four differently-shaped pairs of co-operating die wheels used according to preferred embodiments of the present invention for creasing corrugated board in the machine direction.
Figure 9:
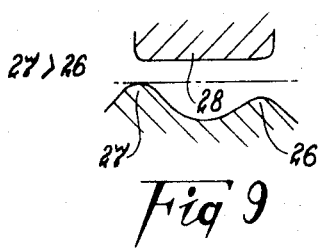
Figure 10:
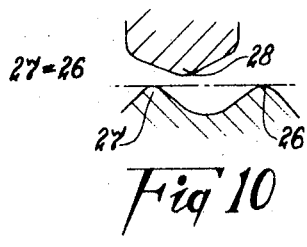
Figure 11:
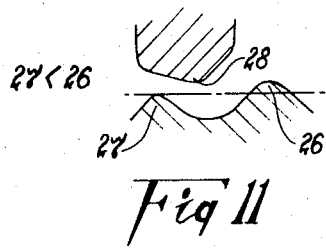

These characteristics may be realized in several ways and the accompanying FIGS. 8 to 11 show suitable wheel rim sections (and hence crease profiles), the letters 26 and 27 representing the height of the flanges so indicated. The bias towards the primary crease corresponding to 27 is evident although the height of the flange forming the secondary crease corresponding to 26 may vary in relation to the flange forming the primary crease as shown in FIGS. 8 to 11. Thus in FIGS. 8 and 9 flange 27 is higher than 26. In FIG. 10 they are of equal height, while in FIG. 11, 26 is higher than 27.

The crease form provided by my invention as described above is in particular eminently suitable for the M.D. crease and it can also be used for the C.D. crease which is folded through 180°. For the C.D. crease which is folded through 90° the secondary crease is generally unnecessary. It has been found that the crease form and the resulting configuration of the 90° C.D. crease shown in FIGS. 14 and 15 are very suitable. This crease form is very narrow and results in an extremely strong edge. In particular the slope of the bending torque/bending angle for board with the 90° crease of my invention, increases markedly at 90°.

My 90° crease may also be employed as an M.D. crease, provided the board is not required to fold inwardly through 180°. Such an M.D. crease is slightly inferior to the previousuly described crease forms for M.D. (FIGS. 8 to 11).

The 90° C.D. crease profile has been found to be also suitable for folding through 180° but, in common with other crease profiles in commercial use it leads occasionally to a poorly formed crease. The main feature of any C.D. crease, which is parallel to the flutes, is that its position in relation to the flute profile varies in a random fashion.

It follows that deformation of a folded board depends on the location of the crease in relation to the flute profile. I have found that the worst type of deformation occurs when the crease in the inner liner happens to fall directly opposite a "peak" of flute profile, i.e. opposite a region along which the interior corrugated member is secured to the outer liner. This is indicated in FIG. 5.

FIG. 6 shows an intermediate deformation this board assumes during folding. It can be seen that the central peak of the inner liner is accompanied by two distinct bulges 31, 32 one on each side. These bulges, in turn cause depressions 33, 34 two full flute wavelengths away from the central peak and when the fold through 180° is completed a deformation as shown in FIG. 7 is observed. Such deformation amounts to a damage of the walls over a breadth of up to four full flute wavelengths along one crease. For reasons of both strength and appearance of the box, such damage has to be avoided.

To keep the wall damage to a minimum consistent with producing a 180° fold I may modify the 90° C.D. crease profile of FIG. 14 in a manner shown diagrammatically in FIG. 18 (the two cooperating dies are shown set widely apart only to illustrate the principle).

The broad, slightly slanting face of the inner die compresses the bottom portion of the flute profile, shown in FIG. 18 on the right-hand side of the crease position indicated by the arrow. When folded, this compressed flute 35 deforms readily so that the fully preserved left-hand flute 36 can be easily accommodated. Configuration of the board assumed during and at the completion of folding is shown in FIGS. 19 and 20 respectively. Damage to the board walls is much smaller in FIG. 20 than it is in FIG. 7.

It will be appreciated that provided the characteristic shapes of the crease profiles according to the invention are preserved, the actual dimensions can vary. In other words, the invention is in general concerned with relative rather than absolute dimensions.

FIG. 16 shows the salient features of one form of M.D. crease profile provided by the invention. A total of three creases is formed, all of substantially V-shape in cross-section with curved apices. The primary crease is denoted by 27 and the secondary crease by 26. In general angle $a$ between the inside face 37 of the primary crease and the tangent at its apex can vary from 15° to 45° e.g. 30°, and angle $b$ between the adjacent side 38 of the outer liner crease and the tangent at its apex is up to 20° smaller than $a$, so that the adjacent sides 37, 38 diverge laterally toward secondary crease 26. Angle $c$ is preferably from 20 to 60° and $d$ so chosen that a distinct secondary crease is formed so as to fold subsequent to primary crease 27. Distance A between the apices of the primary and secondary creases is preferably greater than 0.150 inch. For ordinary corrugated board A need not in general exceed 0.400 inch. The position of apex 28 considered in lateral relation to 27 and 26 is determined by the requirement of producing distinct primary and secondary creases. The nip distance $e$ between the die wheel rims is also determined in the course of operation. Both the position of 28 and the rim separation can be regarded as operating variables chosen to best suit the materials and the specific operating situation.

FIG. 14 illustrates one form of 90° C.D. crease profile provided by the invention. Here the inner liner creased zone is formed by a single crease substantially identical in cross-section with the outer liner crease. Each crease may be substantially V-shaped in cross-section with a convex apex e.g. of radius of curvature about 0.030 inch. Angles $e$ are not critical, nor need they of necessity be the same. In other words, each crease profile may be asymmetrical in itself. It has been found that $e=45°$ gives satisfactory results. The crease apices are laterally offset by a distance B which is an operating variable, as is the rim separation. In general, B may be of the order of 0.150 inch.

FIG. 17 shows one form of 180° C.D. crease profile provided by the invention. Here again, the outer liner crease is substantially V-shaped in cross-section with a convex apex 28, but one side of the crease is formed with a laterally-extended shoulder 39. The creased zone in the inner liner is also substantially V-shaped in cross-section but has its convex apex 40 laterally offset from the apex of the outer liner crease and to the same side thereof as shoulder 39. The side 41 of the creased zone remote from the outer liner crease is so oriented with respect to shoulder 39 as to diverge laterally therefrom in a direction away from the crease, the angle of divergence being preferably about 20°. Preferably diverging side 41 is inclined away from the outer liner crease at an angle denoted by $h$ of from 0 to 30° to the tangent at the convex apex 40 of the zone. Furthermore for reasons described hereinabove, the effective width C of said diverging side 41 of the creased zone exceeds half the corrugation wavelength of the interior corrugated member. For the corrugation commonly known in the trade as "B-flute," this dimension C should preferably exceed 0.125 inch e.g. 0.170 inch. Angles $f$ and $g$ may be substantially 45°, while dimension D and the rim spacing are operating variables.

The crease profiles described above can obviously be geometrically approximated by using curved surfaces, instead of straight faces, which are here indicated by angles. Such approximations may be deemed to fall within the scope of this invention, if their effect is the same or basically the same.

The crease profiles of this invention have been tested on a commercial scale and in the results obtained were satisfactory in every respect. Briefly, they were as follows:

(a) The edges of the boxes are clearly defined, i.e. sharp and very straight;

(b) The force required to fold a flap has been reduced to as low as one third of the force required to fold the same board but creased with the known three-point crease;

(c) As a consequence of the reduced force required to fold the board, the stresses in the outer ply are considerably reduced and the tendency of the ply to crack is virtually eliminated. It has been found that boards normally completely unsatisfactory for box making because of their tendency to crack can be used without cracking when creased in accordance with this invention;

(d) Compression strength of the boxes depends on a number of variables and some are difficult to control. Testing of comparative boxes has shown increases of compression strength up to 17 percent, and (e) Box dimensions can vary, mainly because of inaccuracies introduced by the varying positions of the C.D. creases. This is particularly so when the inner liner is considerably lighter than the outer liner. It has been found that the C.D. crease of this invention gives boxes of improved dimensional accuracy in this case.

Although the invention has been particularly described in relation to the formation of boxes, it is to be understood that it applies to the creasing of corrugated board for any purpose for which the board is to be folded.

Having now described my invention, what I claim as new and desire to secure by Letters Patent is:

1. A method of forming foldable creases in corrugated board, which method comprises forming one substantially straight crease only in the outer liner and forming a substantially straight primary crease in the inner liner and corrugated member, said primary crease being substantially parallel to the outer liner crease and laterally offset therefrom so that the creases define a creased zone which forms a hinge which is asymmetrical in cross-section, the width of said zone being such that during folding of the board sufficient inward deformation of the inner liner and corrugated member occurs in and adjacent to their creased zone to reduce outward bulging of the inner liner at its crease, while reducing cracking at this crease, the inner and outer liners of each of the relatively folded portions of the corrugated board remaining substantially flat and parallel up to a zone adjacent to said crease and creased zone.

2. A method of forming foldable creases in corrugated board, which method comprises forming one substantially straight crease only in the outer liner and forming a substantially straight crease in the inner liner and corrugated member, the latter crease having a greater effective width than the former and having a maximum creasing axis extending substantially parallel to but laterally offset from the outer liner crease so that the creases define a creased zone forming a hinge that is asymmetrical in cross-section, the width of said zone being such that during folding of the board so as to overlie said inner liner, sufficient inward deformation of the inner liner and corrugated member occurs in and adjacent to the creased zone to reduce outward bulging of the inner liner and at the same time permit effective bending of the outer liner at its crease while reducing cracking at this crease, the inner and outer liners of each of the relatively folded portions of the corrugated board remaining substantially flat and parallel up to a zone adjacent to said creases, even if the folding operation occurs through an angle of 180°.

3. A method as claimed in claim 1 wherein a secondary crease is also formed in the inner liner, substantially parallel to and less deep than the primary crease, said primary and secondary creases being disposed on laterally opposite sides of the outer liner crease and forming therewith said creased zone.

4. A method as claimed in claim 1 wherein the effective breadth of the outer liner crease is substantially equal to the distance between the apices of the primary and secondary creases.

5. A method as claimed in claim 1 wherein the outer liner crease and the primary and secondary creases are of substantailly V-shape in cross-section with convex apices, the adjacent faces of the outer liner crease and primary crease being so mutually inclined as to diverge toward the secondary crease.

6. A method as claimed in claim 5 wherein said adjacent faces diverge at an angle of substantially 20°.

7. A method as claimed in claim 5 wherein the angle between said adjacent face of the primary crease and the tangent at the apex of said primary crease and the tangent at the apex of said primary crease is between 15 and 45°.

8. A method as claimed in claim 7 wherein said angle is substantially 30°.

9. A method as claimed in claim 5 wherein the angle between the other face of the outer liner crease and the tangent at the apex of the outer liner crease is from 20° to 60°.

10. A method as claimed in claim 6 wherein the distance between the apices of the primary and secondary creases is from 0.150 inch to 0.400 inch.

11. A method as claimed in claim 1 wherein the creased zone extends in the machine direction.

12. A method of forming foldable creases in corrugated board, which method comprises forming one substantially straight crease only in the outer liner and forming one substantially straight primary crease only in the inner liner and corrugated member, said primary crease being substantially parallel to and substantially identical in cross-section with the outer liner crease and laterally offset therefrom so that the creases define a creased zone forming a hinge that is asymmetrical in cross-section, the width of said zone being such that during folding of the board through an angle of 90° sufficient inward deformation of the inner liner and corrugated member occurs in and adjacent to their creased zone to reduce outward bulging of the inner liner at its crease, while reducing cracking at this crease, the inner and outer liners of each of the relatively folded portions of the corrugated board remaining substantially flat and parallel up to a zone adjacent to said crease and creased zone.

13. A method as claimed in claim 12 wherein both outer liner and primary creases are substantially V-shaped in cross-section with a convex apex.

14. A method as claimed in claim 13 wherein the sides of each crease are inclined at substantially 45° to their respective axes of symmetry and said apex has a radius of curvature of substantially 0.030 inch.

15. A method as claimed in claim 1 wherein the outer liner crease is of substantially V-shape in cross-section with a convex apex, one side of said crease being formed with a laterally extended shoulder, said primary crease also being of substantially V-shape in cross-section with a convex apex laterally offset from the apex of the outer liner crease to the same side as the shoulder thereof, the adjacent sides of the respective creases being substantially parallel, the side of the primary crease remote from the outer liner crease being so oriented with respect to the shoulder as to diverge laterally therefrom in a direction away from the outer liner crease.

16. A method as claimed in claim 15 wherein said adjacent sides are both inclined at substantially 45° to the tangents at their apices, each apex having a radius of curvature of substantially 0.030 inch.

17. A method as claimed in claim 15 wherein the effective width of said diverging side of the primary crease exceeds half the corrugation wave length.

18. A method as claimed in claim 15 wherein the angle of said divergence is substantially 20°.

19. A method as claimed in claim 18 wherein said diverging side is inclined away from the outer liner crease at an angle of from 0 to 30° to the tangent at the convex apex of the primary crease.

20. A method as claimed in claim 1 wherein the creased zone extends in the cross direction.

References Cited

UNITED STATES PATENTS

| | | | |
|---|---|---|---|
| 1,482,569 | 2/1924 | Lange | 229—(Folds) |
| 1,655,505 | 1/1928 | Lange | 93—58 |
| 2,604,984 | 7/1952 | Apgar | 206—46 |
| 3,122,300 | 2/1964 | Bombard | 229—(Folds) |
| 3,314,339 | 4/1967 | Guffy et al. | 93—58.1 |

SAMUEL W. ENGLE, Primary Examiner

U.S. Cl. X.R.

93—58 R; 229—Dig 4